H. T. KELLOGG.
ADJUSTABLE KETTLE PROTECTOR.
APPLICATION FILED MAR. 18, 1911.

1,009,527.

Patented Nov. 21, 1911.

Witnesses
A.W.Gardes.

Inventor
Helena T Kellogg
By Victor J. Evans
Attorney

UNITED STATES PATENT OFFICE.

HELENA T. KELLOGG, OF DAYTON, OHIO.

ADJUSTABLE KETTLE-PROTECTOR.

1,009,527.  Specification of Letters Patent.  Patented Nov. 21, 1911.

Application filed March 18, 1911. Serial No. 615,323.

*To all whom it may concern:*

Be it known that I, HELENA T. KELLOGG, a citizen of the United States, residing at Dayton, in the county of Montgomery and State of Ohio, have invented new and useful Improvements in Adjustable Kettle-Protectors, of which the following is a specification.

The invention relates to protector plates and more particularly to the class of adjustable kettle protectors and is an improvement in Letters Patent Number 889,020 issued to me May 26, 1908.

The primary object of the invention is the provision of a device of this character in which food held within a kettle will be prevented from sticking to the bottom of the said kettle during the cooking operation thereby obviating the scorching or burning of the food.

Another object of the invention is the provision of a device of this character which is capable of adjustment so as to vary the sides thereof to enable its use with different size kettles and is provided with supporting legs or webs which will sustain the device elevated or super-posed above the bottom of the kettle when it is placed therein thereby holding food contents of the kettle away from its bottom to avoid the scorching or burning of the food.

A further object of the invention is the provision of a device of this character which is simple in construction, thoroughly reliable and efficient in operation and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
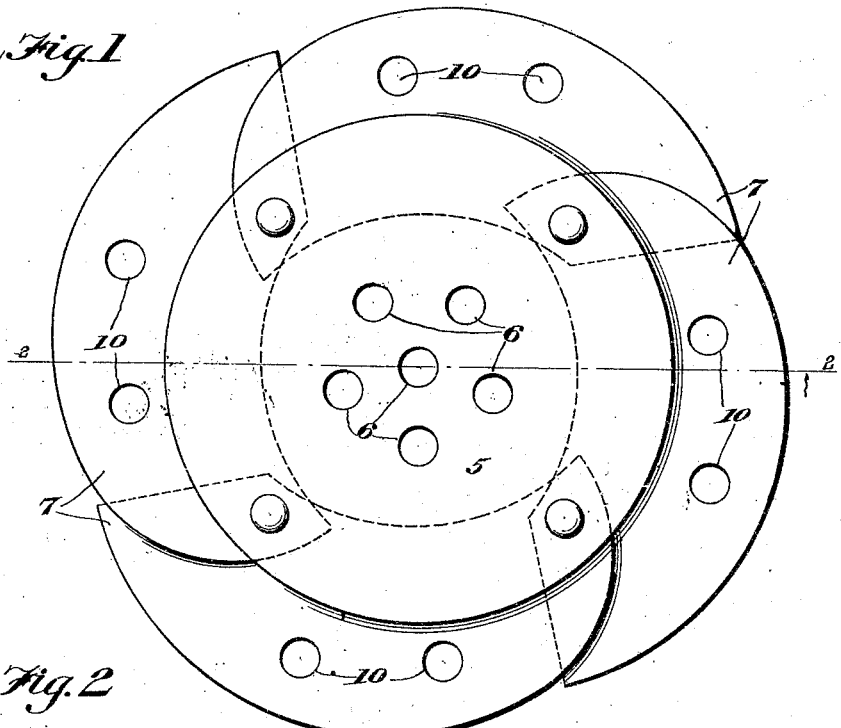
Figure 2:
Figure 3:
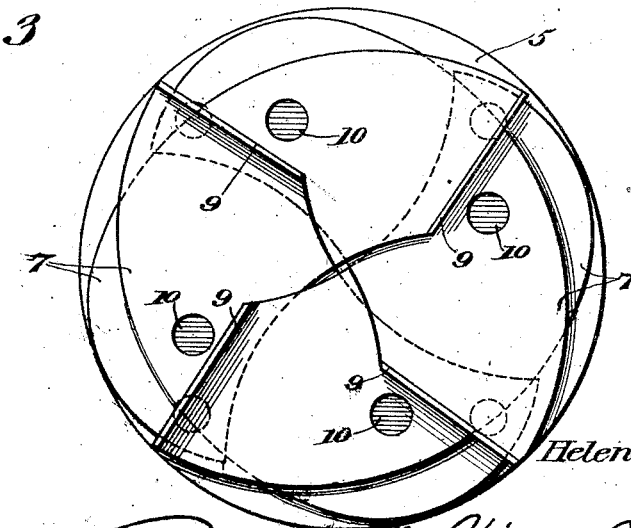

In the drawings, Figure 1 is a top plan view of a protector constructed in accordance with the invention showing the radially disposed wings thrown outward. Fig. 2 is a sectional view on the line 2—2 of Fig. 1. Fig. 3 is a bottom plan view showing the wings in contracted position or thrown inward upon the center disk of said device.

Similar reference characters indicate corresponding parts throughout the several views in the drawings.

Referring to the drawings by numerals, a protector with a sheet metal center disk or plate 5 provided with a series of perforations 6 which may be of any size and of any number as may be required. Connected near the periphery of the center disk or plate 5 at its bottom are a series of segmental shape adjustable wings 7 the same being connected to the said plate or disk by means of pivots 8 at their inner ends so that they may swing inwardly and outwardly for decreasing or increasing the size of the device. It will be noted that the wings 7 overlap each other when either swinging inwardly or outwardly with respect to the center disk or plate 5 so that the protector will substantially cover the bottom of a kettle for holding food therein from contact with the said bottom and thus prevent such food from becoming burned or scorched.

The outer or free ends of the wings 7 are bent downwardly and at right angles to themselves to provide out-turned supporting legs or webs 9 the same being disposed radially from the center disk or plate 5 and are adapted to rest upon the bottom of a kettle for supporting the protector elevated from the said bottom, the wings being provided with a plurality of perforations 10 which together with the perforations in the center plate or disk 5 permit fluid contents of the kettle to freely circulate therein beneath the protector when positioned in the said kettle. It is evident that the protector can be adjusted for various sizes of kettles.

From the foregoing it is thought that the construction and operation of the device will be clearly apparent and therefore a more extended explanation has been omitted.

What is claimed is:

A kettle protector comprising a perforated disk, a series of wings pivoted near the outer edge of said disk and adapted for inward and outward swinging movement relative thereto, the said wings being provided with a series of perforations, the ends of said wings being bent downwardly and at right angles to themselves to provide supporting legs, said legs being disposed radially with respect to the center of the said disk.

In testimony whereof I affix my signature in presence of two witnesses.

HELENA T. KELLOGG.

Witnesses:
ROY EBERT,
S. L. CAYLOR.